United States Patent
Pattok et al.

(10) Patent No.: US 11,738,796 B2
(45) Date of Patent: Aug. 29, 2023

(54) RECIRCULATING BALL POWER STEERING SYSTEM WITH SLIDING JOINT

(71) Applicant: Steering Solutions IP Holding Corporation, Saginaw, MI (US)

(72) Inventors: Eric D. Pattok, Frankenmuth, MI (US); Travis L. Palmer, Frankenmuth, MI (US); Caleb S. Palmer, Freeland, MI (US); Bruce M. Collier, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 174 days.

(21) Appl. No.: 17/100,085

(22) Filed: Nov. 20, 2020

(65) Prior Publication Data
US 2022/0032991 A1    Feb. 3, 2022

Related U.S. Application Data

(60) Provisional application No. 63/057,637, filed on Jul. 28, 2020.

(51) Int. Cl.
*B62D 3/08*   (2006.01)
*B62D 5/04*   (2006.01)

(52) U.S. Cl.
CPC ............. *B62D 3/08* (2013.01); *B62D 5/0421* (2013.01); *B62D 5/0454* (2013.01)

(58) Field of Classification Search
CPC ....... B62D 5/0454; B62D 5/0421; B62D 3/08
USPC ............. 74/424.84, 424.79, 424.81; 180/444
See application file for complete search history.

(56) References Cited

U.S. PATENT DOCUMENTS

| | | | | |
|---|---|---|---|---|
| 1,921,122 A | * | 8/1933 | Head | B62D 3/08 74/499 |
| 2,214,492 A | * | 9/1940 | Trbojevich | B62D 3/08 74/499 |
| 2,648,994 A | * | 8/1953 | Doerfner | F16H 25/2204 74/499 |
| 2,648,995 A | * | 8/1953 | Doerfner | F16H 25/2204 74/499 |
| 2,688,885 A | * | 9/1954 | Lincoln | F16H 25/2204 74/499 |

(Continued)

FOREIGN PATENT DOCUMENTS

| CN | 107351913 A | * | 11/2017 |
|---|---|---|---|
| CN | 107839424 A | * | 3/2018 |

(Continued)

OTHER PUBLICATIONS

KR 20210051432 English Translation of Description Retrieved from Espace.net (Year: 2022).*

*Primary Examiner* — Minnah L Seoh
*Assistant Examiner* — Myles A Harris
(74) *Attorney, Agent, or Firm* — Dickinson Wright PLLC

(57) ABSTRACT

A recirculating ball power steering system includes an electric motor. The system also includes a ball screw rotatably driven by the electric motor. The system further includes a ball nut translatable along the ball screw in a linear direction during rotation of the ball screw. The system yet further includes a sliding joint in sliding contact with an outer surface of the ball nut, the sliding joint moveable in a non-parallel direction relative to the linear direction of the ball nut.

14 Claims, 5 Drawing Sheets

(56) References Cited

U.S. PATENT DOCUMENTS

| | | | | |
|---|---|---|---|---|
| 3,053,109 A | * | 9/1962 | Folkerts | B62D 3/08 74/499 |
| 4,742,882 A | * | 5/1988 | Shimizu | B62D 5/0448 180/444 |
| 4,771,843 A | * | 9/1988 | Shimizu | B62D 5/0463 701/41 |
| 4,834,202 A | * | 5/1989 | Shimizu | B62D 5/0454 180/444 |
| 4,918,744 A | * | 4/1990 | Shimizu | B62D 5/0463 318/646 |
| 5,991,675 A | * | 11/1999 | Asanuma | B60G 17/0195 701/41 |
| 8,360,197 B2 | | 1/2013 | Escobedo | |
| 2005/0098376 A1 | * | 5/2005 | Ozsoylu | B62D 5/0424 180/444 |
| 2008/0011537 A1 | * | 1/2008 | Ozsoylu | B62D 5/0442 701/41 |
| 2012/0241244 A1 | * | 9/2012 | Escobedo | B62D 5/0421 180/444 |
| 2013/0233117 A1 | * | 9/2013 | Read | B62D 1/192 74/493 |
| 2015/0232117 A1 | * | 8/2015 | Stinebring | B62D 1/181 74/493 |
| 2017/0361863 A1 | * | 12/2017 | Rouleau | B62D 1/195 |
| 2018/0354547 A1 | * | 12/2018 | Pattok | B62D 7/14 |
| 2019/0126969 A1 | * | 5/2019 | Scheuerell | B62D 7/16 |
| 2019/0300042 A1 | * | 10/2019 | Derocher | B62D 1/185 |

FOREIGN PATENT DOCUMENTS

| | | | |
|---|---|---|---|
| DE | 976139 C | * | 3/1963 |
| GB | 393839 A | * | 6/1933 |
| GB | 825313 A | * | 12/1959 |
| KR | 20090100729 A | * | 9/2009 |
| KR | 20160064818 A | * | 6/2016 |
| KR | 20210051432 A | * | 5/2021 |

* cited by examiner

US 11,738,796 B2

RECIRCULATING BALL POWER STEERING SYSTEM WITH SLIDING JOINT

CROSS-REFERENCE TO RELATED APPLICATION

This application claims the benefit of priority to U.S. Provisional Patent Application No. 63/057,637, filed Jul. 28, 2020, the disclosure of which is incorporated by reference herein in its entirety.

FIELD OF THE INVENTION

The present disclosure relates to vehicle steering systems and, more particularly, to a recirculating ball power steering system having a sliding joint.

BACKGROUND

Power steering systems assist the driver of the vehicle in steering by adding power to that supplied by the driver and reducing the effort needed to turn the steering wheel manually. A typical integral gear that may be part of such power steering systems uses hydraulic fluid that pushes on a rack-piston-nut which drives a sector gear and thus provides assist torque at the output shaft. The created torque is used to reduce driver effort for steering, as noted above. Typically, a toothed, sector gear is utilized to transmit the output torque. However, the sector gear results in undesirable separating loads during operation due to forces generated with one or more components that connect a driven nut and the sector gear.

SUMMARY

According to one aspect of the disclosure, a recirculating ball power steering system is provided. The system includes an electric motor. The system also includes a ball screw rotatably driven by the electric motor. The system further includes a ball nut translatable along the ball screw in a linear direction during rotation of the ball screw. The system yet further includes a sliding joint in sliding contact with an outer surface of the ball nut, the sliding joint moveable in a non-parallel direction relative to the linear direction of the ball nut.

According to another aspect of the disclosure, a recirculating ball power steering system is provided. The system includes an electric motor. The system also includes a ball screw rotatably driven by the electric motor. The system further includes a ball nut translatable along the ball screw during rotation of the ball screw. The system yet further includes a sliding joint in sliding contact with an outer surface of the ball nut. The system also includes a lever arm extending from a first end to a second end, the lever arm pivotally coupled to the sliding joint proximate the first end of the lever arm. The system further includes a sector gear teeth arrangement formed on the second end of the lever arm.

According to yet another aspect of the disclosure, a recirculating ball power steering system is provided. The system includes an electric motor. The system also includes a ball screw rotatably driven by the electric motor. The system further includes a ball nut translatable along the ball screw during rotation of the ball screw. The system yet further includes a sliding joint in sliding contact with an outer surface of the ball nut. The system also includes a lever extending from a first end to a second end, the lever pivotally coupled to the sliding joint proximate the first end of the lever. The system further includes a Pitman shaft coupled to the lever proximate the second end of the lever.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a portion of a recirculating ball power steering system is illustrated. The recirculating ball power steering system disclosed herein is utilized to reduce separating loads of the system by using a sliding joint and a lever arm.

Figure 1:
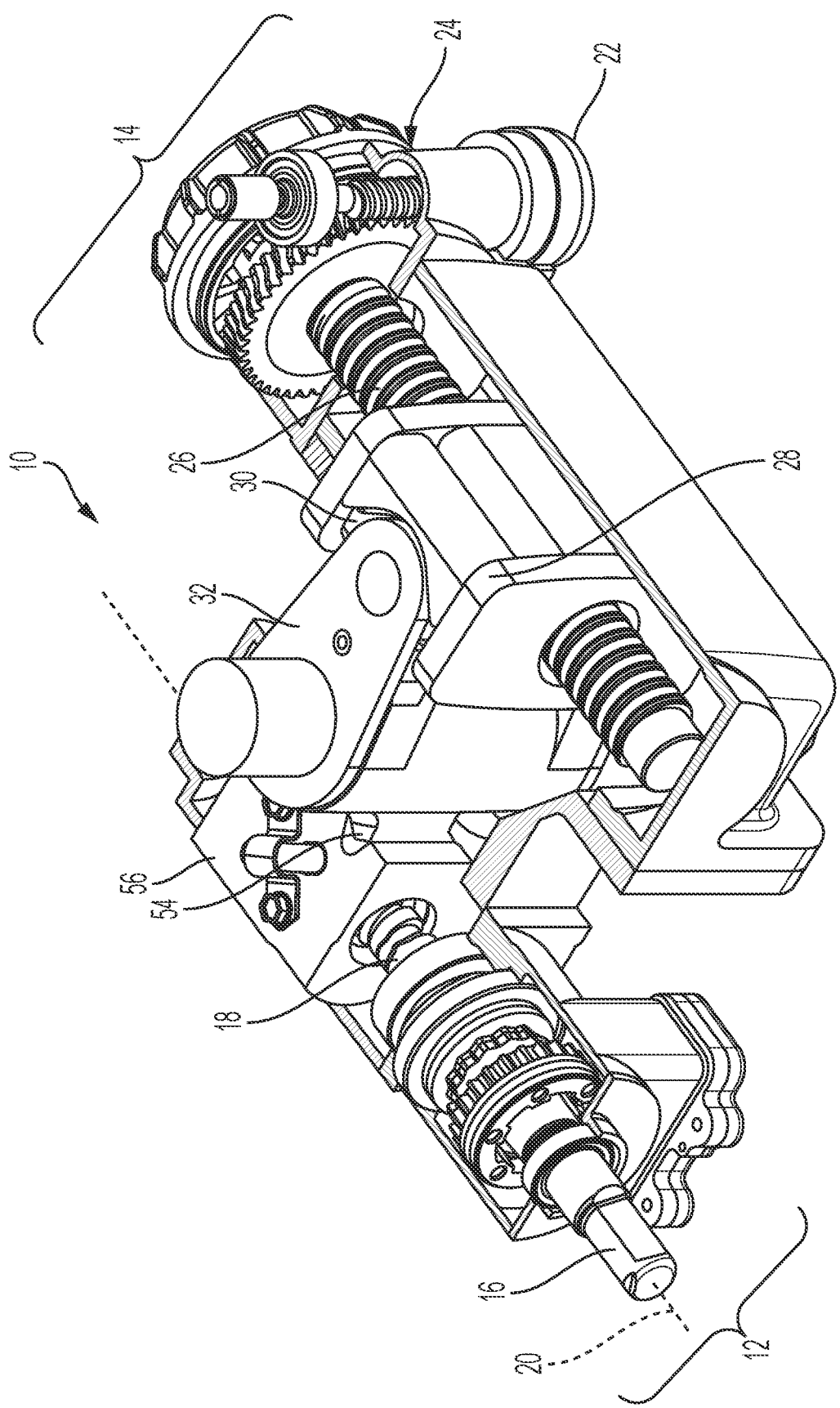
FIG. 1 is a perspective view of a portion of a recirculating ball power steering system according to an aspect of the disclosure.
Figure 3:
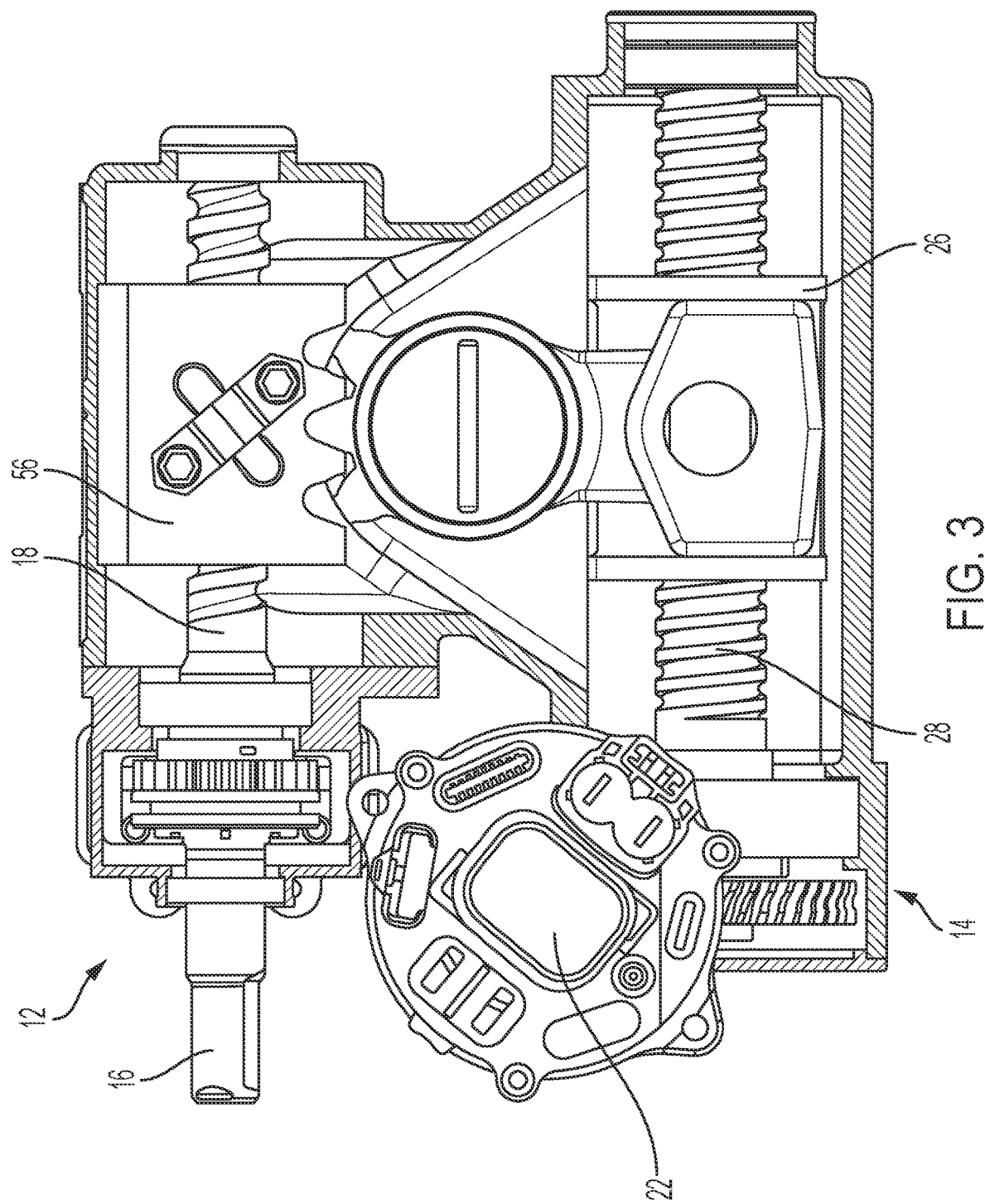
FIG. 3 is an elevational view of the recirculating ball power steering system of FIG. 1.

Referring to FIGS. 1 and 3, illustrated is a recirculating ball power steering system 10 for applying torque to provide steering based on a signal. The power steering system 10 includes a driver input portion 12 and an assist portion 14. The driver input portion 12 includes a steering shaft 16 and an input screw 18 extending along a first axis 20. The assist portion 14 includes an electric motor 22, a gear reduction assembly 24, a ball nut 26 and ball screw 28, a sliding joint 30 and a lever arm 32. The lever arm 32 rotates an assist arm, which operatively connects the driver input portion 12 to the assist portion 14. The power steering system 10 takes a driver input torque signal and provides steering torque to the driver input portion 12 via the assist portion 14.

The electric motor 22 provides torque to the gear reduction assembly 24. By way of non-limiting example, the gear reduction assembly may include a worm gear assembly or a belt and pulley arrangement. The electric motor 22, in combination with the gear reduction assembly 24, spins the ball screw 28, which converts such rotation to linear motion of the ball nut 26.

Figure 4:
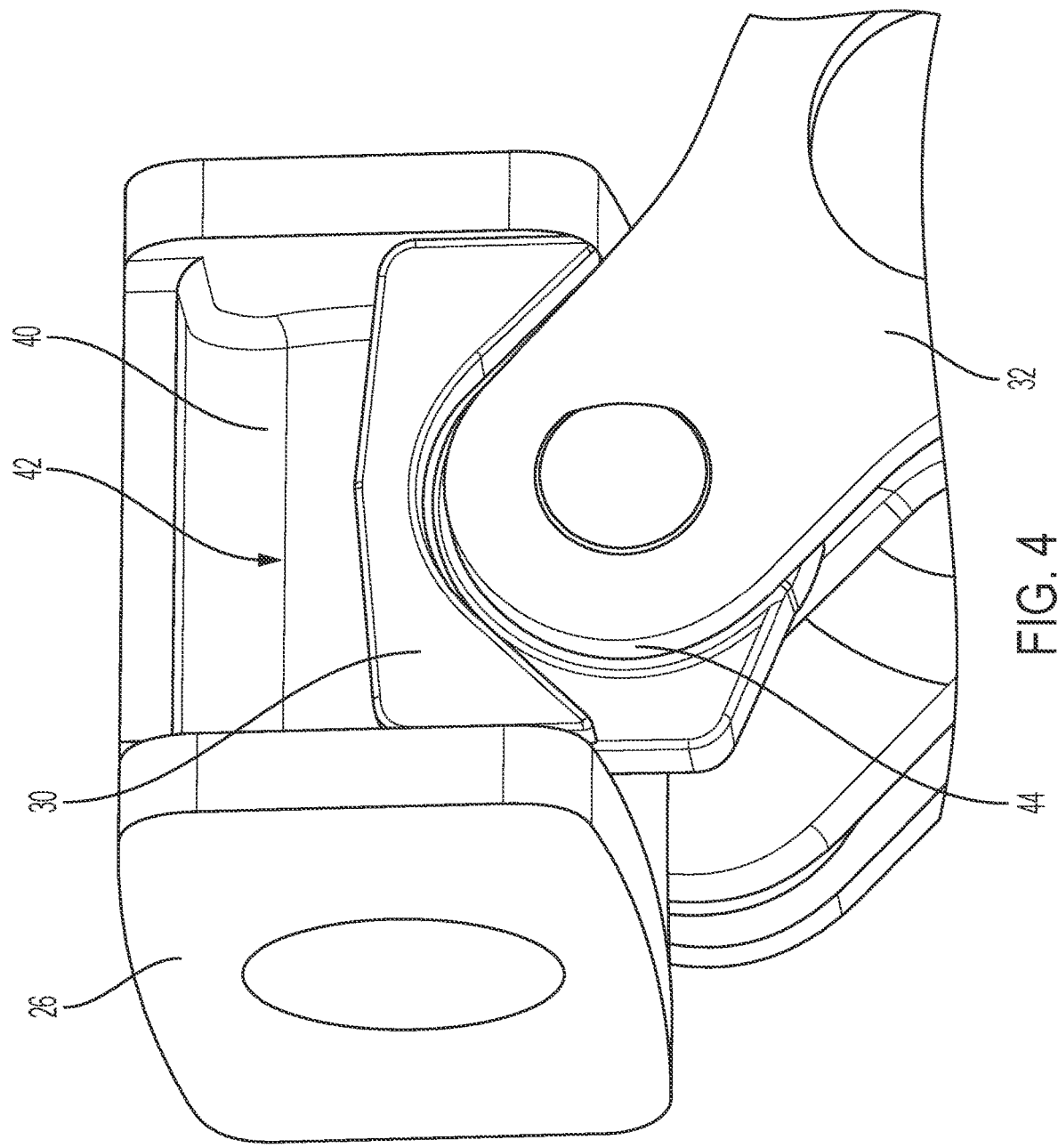
FIG. 4 is a perspective view of a sliding joint of the recirculating ball power steering system.

Referring to FIG. 4, with continued reference to FIGS. 1 and 3, the ball nut 26 and the sliding joint 30 are shown in greater detail. The ball nut 26 has its rotational movement constrained to provide linear movement of the ball nut 26 along the ball screw 28. The sliding joint 30 is positioned on an outer surface 40 of the ball nut 26. In some embodiments, such as that shown in the illustrated embodiments, the ball nut 26 defines a pocket 42 which the sliding joint 30 is positioned within. In some embodiments, another sliding joint (not shown) is positioned on an opposite side relative to the outer surface 40 of the ball nut 26 to provide a pair of sliding joints.

During linear movement of the ball nut 26, the sliding joint 30 moves linearly to correspond to the linear direction of movement of the ball nut 26, but the sliding joint 30 also is capable of sliding in a non-parallel direction relative to the linear direction of the ball nut 26. In some embodiments, the non-parallel direction of movement of the sliding joint 30 is substantially perpendicular to the linear direction of the ball nut 26, but it is to be appreciated that other angles are contemplated.

Figure 5:
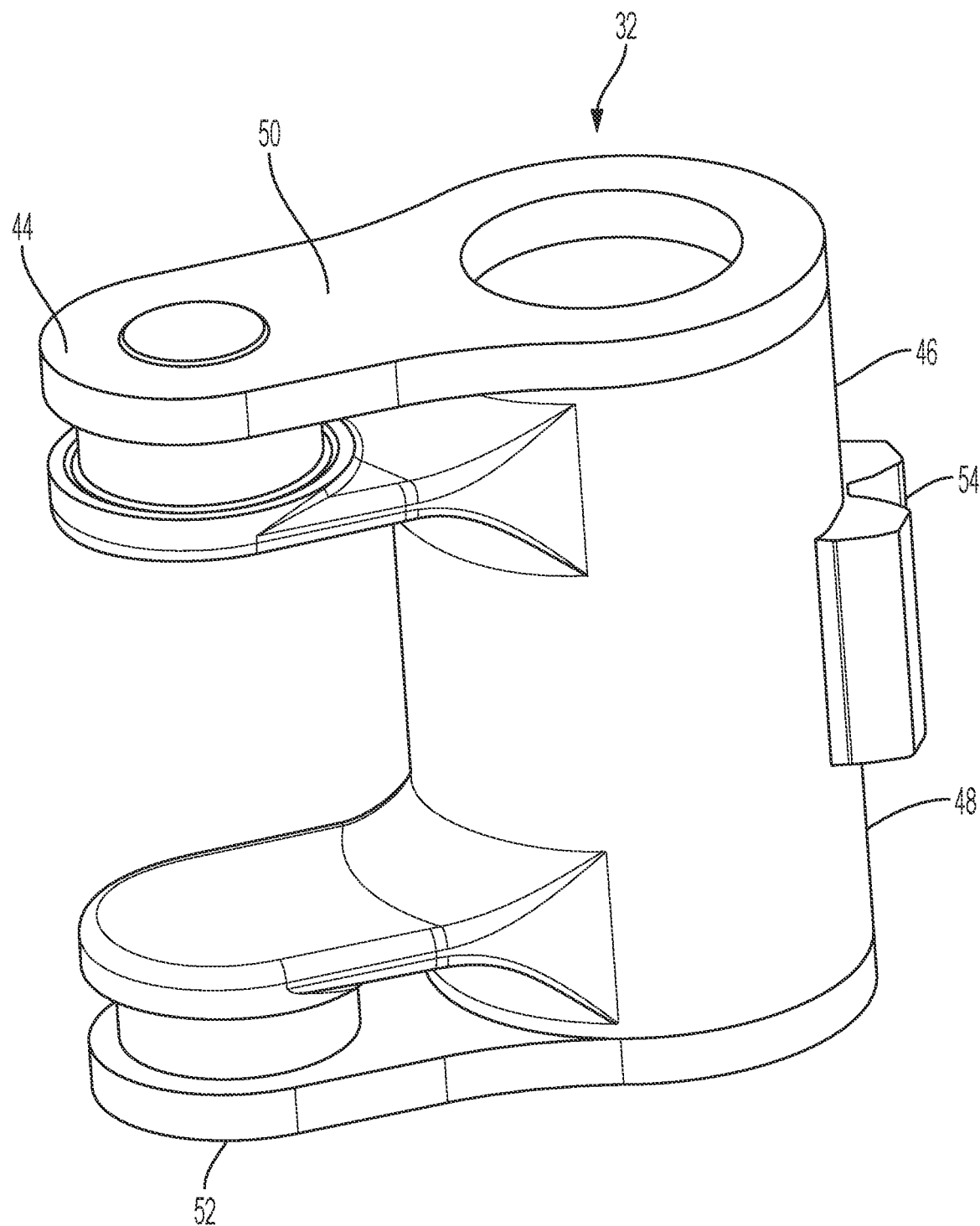
FIG. 5 is a perspective view of an arm of the recirculating ball power steering system.

As shown in FIGS. 4 and 5, the lever arm 32 extends from a first end 44 to a second end 46. The lever arm 32 comprises a substantially cylindrical body portion 48, a first arm 50 extending from the body portion 48, and a second arm 52 extending from the body portion 48. The first arm 50 is pivotally coupled to the sliding joint 30 and the second arm 52 is pivotally coupled to the additional sliding joint (not shown). In other words, the lever arm 32 is pivotally coupled to the sliding joint 30 (and additional sliding joint) proximate the first end 44 of the lever arm 32. The lever arm 32 is operatively coupled to the driver input portion 12 proximate the second end 46 of the lever arm 32, as shown in FIG. 1. As shown, the second end 46 of the lever arm 32 has a sector gear teeth arrangement 54 formed thereon. The sector gear teeth arrangement 54 is engaged with a nut 56 of the driver input portion 12.

Although described herein and illustrated as having a direct connection between the lever arm 32 and the nut 56 of the driver input portion 12, it is to be appreciated that intermediate components may be utilized to transfer the pivoting motion of the lever arm 32 to the nut 56. For example, the second end 46 of the lever arm 32 may be indirectly coupled to the driver input portion 12 with a Pitman shaft. In such an example, the Pitman shaft has the sector gear teeth arrangement formed thereon, with the sector gear teeth arrangement engaged with the nut 56 of the driver input portion 12. Other force/torque transmitting transfer schemes are contemplated.

Figure 2:
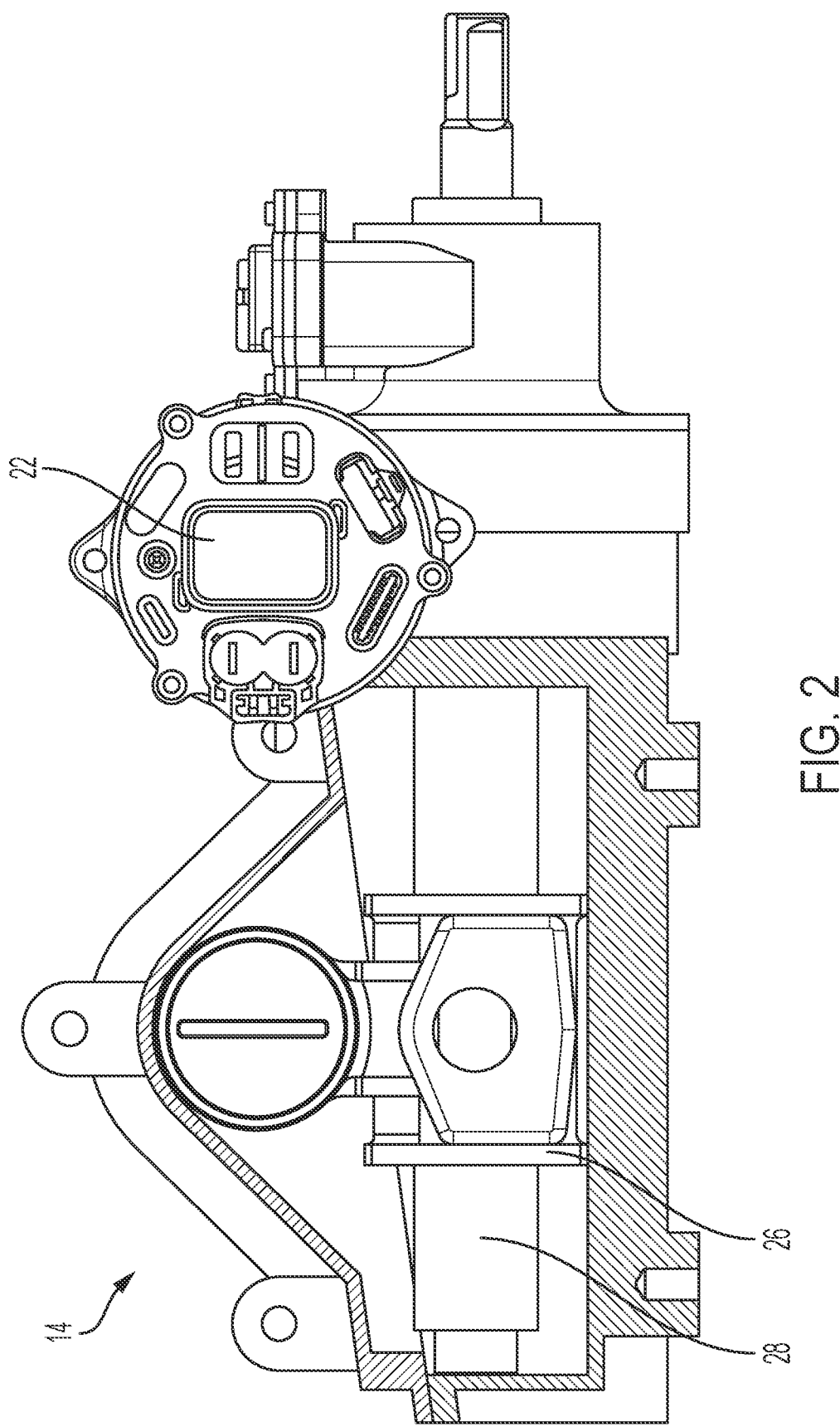
FIG. 2 is an elevational view of a recirculating ball power steering system illustrating another embodiment of the disclosure.

Referring to FIG. 2, another embodiment of the recirculating ball power steering system 10 is shown. In the illustrated embodiment, the system 10 does not have separate assist and driver input portions, but the drive input goes through the lever arm as well. This reduces the number of components needed, but also causes the driver to have a variable steering ratio.

Other embodiments of the recirculating ball power steering system 10 may be utilized in a steer-by-wire system, where the driver input portion of the system 10 is eliminated and the driver input is sent to this system to determine the output torque levels. This type of variation could compensate for the changing ratio much like the variation that has the driver input with the sector gear, as described above.

The embodiments disclosed herein utilize the sliding motion of the sliding joint 30 and the pivoting motion of the lever arm 32 to reduce or eliminate separating loads otherwise incurred from a fixed pivot coupling. Additionally, the embodiments reduce or eliminate a moment otherwise incurred from the rack to sector teeth loads. The reduced separating loads and reduced moment reduce loads on the ball nut 26 and ball screw 28, and eliminate a need to add features to resist these loads.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A recirculating ball power steering system comprising:
an electric motor;
a ball screw rotatably driven by the electric motor;
a ball nut translatable along the ball screw in a linear direction during rotation of the ball screw;
a sliding joint in sliding contact with an outer surface of the ball nut, the sliding joint moveable in a non-parallel direction relative to the linear direction of the ball nut;
a driver input portion; and
a lever arm extending from a first end to a second end, the lever arm pivotally coupled to the sliding joint proximate the first end of the lever arm, the lever arm operatively coupled to the driver input portion proximate the second end of the lever arm.

2. The recirculating ball power steering system of claim 1, wherein the non-parallel direction of movement of the sliding joint is perpendicular to the linear direction of the ball nut.

3. The recirculating ball power steering system of claim 1, wherein the second end of the lever arm has a sector gear teeth arrangement formed thereon, the sector gear teeth arrangement engaged with a nut of the driver input portion.

4. The recirculating ball power steering system of claim 1, wherein the second end of the lever arm is operatively coupled to the driver input portion with a Pitman shaft.

5. The recirculating ball power steering system of claim 4, wherein the Pitman shaft has a sector gear teeth arrangement formed thereon, the sector gear teeth arrangement engaged with a nut of the driver input portion.

6. The recirculating ball power steering system of claim 1, further comprising an additional sliding joint in sliding contact with another outer surface of the ball nut on an opposite side of the ball nut relative to the sliding joint.

7. The recirculating ball power steering system of claim 6, wherein the lever arm comprises a substantially cylindrical body portion, a first arm extending from the body portion, and a second arm extending from the body portion, wherein the first arm is pivotally coupled to the sliding joint and the second arm is pivotally coupled to the additional sliding joint.

8. The recirculating ball power steering system of claim 1, wherein the recirculating ball power steering system is part of a steer-by-wire steering system.

9. A recirculating ball power steering system comprising:
an electric motor;
a ball screw rotatably driven by the electric motor;
a ball nut translatable along the ball screw during rotation of the ball screw;
a sliding joint in sliding contact with an outer surface of the ball nut;
a lever arm extending from a first end to a second end, the lever arm pivotally coupled to the sliding joint proximate the first end of the lever arm; and
a sector gear teeth arrangement formed on the second end of the lever arm.

10. The recirculating ball power steering system of claim 9, wherein the sliding joint is moveable in a non-parallel direction relative to the linear direction of the ball nut.

11. The recirculating ball power steering system of claim 10, wherein the non-parallel direction of movement of the sliding joint is perpendicular to the linear direction of the ball nut.

12. The recirculating ball power steering system of claim 9, further comprising a driver input portion, wherein the sector gear teeth arrangement is engaged with a nut of the driver input portion.

13. The recirculating ball power steering system of claim 9, further comprising an additional sliding joint in sliding contact with another outer surface of the ball nut on an opposite side of the ball nut relative to the sliding joint.

14. The recirculating ball power steering system of claim 13, wherein the lever arm comprises a substantially cylindrical body portion, a first arm extending from the body portion, and a second arm extending from the body portion, wherein the first arm is pivotally coupled to the sliding joint and the second arm is pivotally coupled to the additional sliding joint.

* * * * *